US012662983B2

(12) United States Patent
Simon et al.

(10) Patent No.: US 12,662,983 B2
(45) Date of Patent: Jun. 23, 2026

(54) PUMP

(71) Applicant: PHINIA DELPHI LUXEMBOURG SARL, Belvaux (LU)

(72) Inventors: Jérôme Simon, Vineuil (FR); Vincent Pichon, Blois (FR)

(73) Assignee: PHINIA DELPHI LUXEMBOURG SARL, Belvaux (LU)

( * ) Notice: Subject to any disclaimer, the term of this patent is extended or adjusted under 35 U.S.C. 154(b) by 0 days.

(21) Appl. No.: 18/998,254

(22) PCT Filed: Jul. 24, 2023

(86) PCT No.: PCT/EP2023/070417
§ 371 (c)(1),
(2) Date: Jan. 24, 2025

(87) PCT Pub. No.: WO2024/023003
PCT Pub. Date: Feb. 1, 2024

(65) Prior Publication Data

US 2026/0028954 A1 Jan. 29, 2026

(30) Foreign Application Priority Data

Jul. 25, 2022 (GB) ..................................... 2210826

(51) Int. Cl.
*F02M 59/46* (2006.01)
*F02M 63/00* (2006.01)

(52) U.S. Cl.
CPC ........ *F02M 59/46* (2013.01); *F02M 63/0036* (2013.01); *F02M 63/005* (2013.01)

(58) Field of Classification Search
CPC .. F02M 59/46; F02M 63/0036; F02M 63/005; F02M 2200/18; F04B 53/1087; F04B 53/1002; F04B 39/1006
See application file for complete search history.

(56) References Cited

U.S. PATENT DOCUMENTS 6,764,286 B2 7/2004 Hunnicutt et al.
10,527,017 B2 * 1/2020 Koga .................. F02M 59/025
(Continued)

FOREIGN PATENT DOCUMENTS

CN 117120713 A 11/2023
DE 3422017 A1 5/1985
(Continued)

OTHER PUBLICATIONS

Machine assisted English translation of CN117120713A obtained from https://patents.google.com/patent on Nov. 18, 2025, 12 pages.
(Continued)

*Primary Examiner* — Grant Moubry
(74) *Attorney, Agent, or Firm* — WARNER NORCROSS + JUDD LLP

(57) ABSTRACT

A pump comprising a check valve, which check valve comprises:
- an axially extending valve bore defined within a pump body of the pump and having an inner surface,
- a seat member defining an axially extending valve channel and having a mounting portion being press-fitted into the valve bore so that it engages the inner surface and a seat portion disposed proximal with respect to the mounting portion, the seat portion defining a seat surface around a proximal opening of the valve channel, wherein a pilot radius, which is a maximum radius of the seat portion, is at least 95% but less than 100% of valve-bore radius of the valve bore so that the seat portion is out of contact with the inner surface, and
- a valve member movable with respect to the seat member and engaging the seat surface in a closed position.

15 Claims, 5 Drawing Sheets

(56) References Cited

U.S. PATENT DOCUMENTS

| | | | | |
|---|---|---|---|---|
| 2004/0191099 | A1 | 9/2004 | Moradmand et al. | |
| 2016/0129536 | A1 | 5/2016 | Huckenbeck et al. | |
| 2017/0321646 | A1 | 11/2017 | Teike et al. | |
| 2018/0128229 | A1* | 5/2018 | Akiyama | F02M 63/0245 |
| 2020/0173391 | A1* | 6/2020 | Perry | F02M 59/464 |
| 2020/0256300 | A1* | 8/2020 | Perry | F04B 1/0452 |
| 2020/0263646 | A1* | 8/2020 | Perry | F04B 49/22 |
| 2022/0381213 | A1* | 12/2022 | Yagai | F02M 63/0036 |

FOREIGN PATENT DOCUMENTS

| | | | |
|---|---|---|---|
| DE | 102013224816 | A1 | 6/2015 |
| EP | 3218595 | B1 | 11/2020 |
| GB | 2263738 | A | 8/1993 |

OTHER PUBLICATIONS

International Search Report for PCT/EP2023/070417 dated Oct. 24, 2023, 3 pages.

Machine assisted English translation of DE102013224816A1 obtained from <https://patents.google.com/patent> on Jan. 23, 2025, 6 pages.

Machine assisted English translation of DE3422017A1 obtained from https://patents.google.com/patent on Jan. 23, 2025, 5 pages.

* cited by examiner

PUMP

CROSS-REFERENCE TO RELATED APPLICATIONS

This application is the U.S. National Stage of International Application No. PCT/EP2023/070417 filed on 24 Jul. 2023, which claims priority to and all advantages of United Kingdom Application No. 2210826.0 filed on 25 Jul. 2022, the contents of which are incorporated herein by reference.

FIELD OF THE INVENTION

The present invention relates to a pump and to a check valve for a pump.

BACKGROUND OF THE INVENTION

Fuel systems in modern internal combustion engines fueled by gasoline, particularly for use in the automotive market, largely employ gasoline direct injection (GDi). In these systems, fuel injectors inject fuel directly into combustion chambers of the internal combustion engine. Commonly, fuel from a fuel tank is supplied under relatively low pressure by a low-pressure fuel pump which is typically an electric fuel pump located within the fuel tank. The low-pressure fuel pump supplies the fuel to a high-pressure fuel pump (also referred to as GDi pump), which typically includes a pumping plunger which is reciprocated by a camshaft of the internal combustion engine. During an intake stroke, fuel is sucked into the pumping chamber, and in a subsequent pumping stroke, the pumping plunger further pressurizes the fuel so that it can be supplied at high pressure to the fuel injectors. In order to avoid backflow from the fuel rail into the pumping chamber, the fuel pump comprises an outlet valve, which is disposed in an outlet passage on a high-pressure side of the pumping chamber.

For safe operation, the GDi pump further includes a relief passage with an embedded relief valve to avoid any overpressure that could burst the pump or any part of the high-pressure system behind the pump (fuel rail, pipes and/or injectors) as well as limiting the pressure so that the pressure never reaches the injector Maximum Opening Pressure (MOP). Such a relief valve normally comprises a stationary seat member and a movable valve member that is biased against the seat member into a closing position. A seat surface of the seat member needs to have a shape corresponding to that of the valve member to avoid any unwanted leakage. A known design provides that the seat member is press-fitted into a bore or channel in a body of the fuel pump. This press-fitting leads to a deformation of the seat member which may also affect the seat surface. Even when the shape of the seat surface is adequately exact before the press-fitting operation, this may no longer be true for the valve in its installed state in the pump.

OBJECT OF THE INVENTION

The object of the present invention is to improve the reliability of a relief valve in a fuel pump.

This object is achieved by a pump according to claim 1 and by a check valve according to claim 15.

SUMMARY OF THE INVENTION

The invention relates to a pump comprising a check valve extending along a valve axis from a proximal side to a distal side. Generally, the pump is adapted for conveying a fluid from at least one inlet to at least one outlet by the action of at least one pumping element (e.g. a plunger). Preferably, the pump is also adapted to increase the pressure of the fluid at the at least one outlet with respect to the at least one inlet. As a rule, the pump may comprise a plurality of valves, some of which will be discussed below. The check valve is designed to only allow fluid flow in one direction, while blocking fluid flow in the opposite direction. It extends along a valve axis, which defines an axial direction, and may at least partially be symmetric with respect to the valve axis. With respect to the valve axis, a proximal side and a distal side can be defined. As will be explained below, the distal side may be in fluid communication with the outlet of the pump, but the invention is not limited to this configuration.

The check valve comprises an axially extending valve bore defined within a pump body of the pump and having an inner surface. The valve bore is normally aligned parallel to the valve axis and is symmetric thereto. It is normally at least partially cylindrical, i.e., it has a circular cross-section. The term “bore” is not to be construed in that the bore has to be manufactured by boring or other chip-removing processes. It is disposed inside a pump body of the pump. The pump body may be made of a single piece, or it may comprise several elements which are connected. It may at least partially be identical with a housing of the pump. The valve bore could also be disposed in a dedicated element that is part of a valve assembly or valve module. Such an element could be a sleeve that forms the valve bore and may be connected to other elements of the pump body. The inner surface defines the valve bore. It is an “inner” surface in that it faces inwards, towards the cavity of the valve bore.

The check valve further comprises a seat member defining an axially extending valve channel and having a mounting portion being press-fitted into the valve bore so that it engages the inner surface, and a seat portion disposed proximal with respect to the mounting portion, the seat portion defining a seat surface around a proximal opening of the valve channel, wherein a pilot radius $r_p$, which is a maximum radius of the seat portion, is at least 95% but less than 100% of valve-bore radius $r_b$ of the valve bore so that the seat portion is out of contact with the inner surface. The valve channel is defined inside the seat member, i.e., it traverses the seat member. It extends axially and is normally aligned along the valve axis. Also, it is usually symmetric to the valve axis. The seat member has a mounting portion that is press-fitted into the valve bore. Accordingly, the seat member is manufactured so that the outer dimensions of the mounting portion are larger than the inner dimensions of the valve bore, so that the seat member can only be inserted into the valve bore under plastic and/or elastic deformation. This also ensures that the seat member engages the inner surface. E.g., a mounting-portion radius of the mounting portion can be larger than the valve-bore radius. During the press-fitting operation, the seat member is moved towards the proximal side. When press-fitting is completed, the seat member is held in position by frictional forces between the mounting portion and the inner surface of the valve bore. A seat portion of the seat member is disposed proximal (i.e., on a proximal side) to the mounting portion. Accordingly, when the seat member is inserted into the valve bore, the seat portion enters the valve bore before the mounting portion. The seat portion defines a seat surface around a proximal opening of the valve channel. One could also say that the seat portion comprises this seat surface, i.e., it is a part of the entire surface of the seat portion (and of the seat member). The seat surface is disposed around an opening of the valve channel on the proximal side. Like the valve channel, the opening is normally symmetric with respect to the valve axis. The same applies to the seat surface, which is usually annular. A pilot radius $r_p$, which is a maximum radius of the seat portion, is at least 95% but less than 100% of valve-bore radius $r_b$ of the valve bore. The term "pilot radius" indicates that one function of the seat portion normally is to pilot (i.e., guide) the seat member during its insertion into the valve bore. The part of the seat portion with the pilot radius is the widest part. This pilot radius is, however, still smaller than a valve-bore radius of the valve bore. Accordingly, the seat portion can be inserted into the valve bore without press-fitting or any other deforming process. Accordingly, the seat portion is out of contact with the inner surface. However, since the pilot radius is at least 95% of the valve-bore radius, the position of the seat member perpendicular to the valve axis is well-defined once the seat portion has been inserted in the valve bore. The pilot radius may be at least 97% or at least 98% of the valve-bore radius.

The check valve also comprises a valve member movable with respect to the seat member and engaging the seat surface in a closed position to close the valve channel. The valve member may be a ball, a needle or any other suitable element for engaging the seat surface. It could also comprise several pieces. In the closed position of the check valve, the valve member sealingly engages the seat surface, thereby preventing any fluid from flowing through the valve channel. The valve member and the seat member cooperate to provide the valve mechanism, wherein the seat member represents the stationary part of the valve mechanism, and the valve member represents the movable part. The valve member is normally biased against the seat member, i.e., into the closed position. Normally, the check valve comprises a spring member for biasing the valve member against the seat surface. Such a spring member acts directly or indirectly between the seat member and the valve member. By the action of the spring member, the valve member is biased against the seat member into a closed position of the check valve. Accordingly, a force acting on the valve member due to a pressure difference between the proximal side and the distal side has to overcome the biasing force to move the valve member into an open position, thereby opening the check valve.

According to the invention, a groove portion is axially interposed between the seat portion and the mounting portion, which groove portion defines a groove extending radially inwards between the seat portion and the mounting portion so that the groove portion is at least partially radially spaced from the inner surface by the groove. Thus, the mounting portion and the seat portion are not disposed axially next to each other, but a groove portion is disposed in between. This groove portion defines a groove that extends radially inwards. Accordingly, the surface of the seat member recedes radially inwards with respect to the mounting portion as well as the seat portion. Of course, the groove also extends axially and tangentially. The groove portion is at least partially spaced from the inner surface by the groove with respect to the radial direction. Therefore, at least a part of the groove portion is out of contact with the inner surface. The groove portion may define a plurality of grooves, but normally it defines a single groove. One could say that the groove separates the mounting portion and the seat portion. This leads to a mechanical decoupling of the seat portion from the mounting portion. When the mounting portion is deformed in the press-fitting operation, there is thus no or only minimal deformation of the seat portion. Accordingly, the intended shape of the seat surface is maintained, resulting in a reliable sealing effect. Another benefit of the design of the inventive seat member is linked to the particular dimension of the pilot radius, which is sufficiently reduced to allow mechanical decoupling of the mounting portion and seat portion, however still represents a significant portion of the valve-bore radius $r_b$, which limits the tilting of the seat member during press fitting.

Although the invention is not limited to this application, it is preferred that the check valve is a relief valve, and the pump is a fuel pump with a pumping chamber connected to a high-pressure outlet via an outlet valve, wherein the distal side is in fluid communication with the high-pressure outlet and the proximal side is in fluid communication with a location upstream of the outlet valve via a relief passage. At least in some embodiments, the fuel pump can be referred to as a high-pressure fuel pump or a gasoline direct injection fuel pump (GDi pump). Normally, fuel from a fuel tank is supplied under relatively low pressure by a low-pressure fuel pump to the high-pressure fuel pump. The high-pressure fuel pump comprises a pumping chamber, usually with a pumping plunger. By the action of the pumping plunger, fuel can be sucked into the pumping chamber during an intake stroke and can subsequently be pressurized and expelled from the pumping chamber during a compression stroke or pumping stroke. Accordingly, the fuel enters the pumping chamber at a low pressure and exits the pumping chamber at a high pressure. The pumping plunger can be operated electrically, or it may be mechanically linked to an engine, in particular to the combustion engine that the fuel pump supplies with fuel. E.g., the pumping plunger can be linked to a camshaft of the engine. Furthermore, the fuel pump comprises an outlet passage at least indirectly connecting the pumping chamber to a high-pressure outlet of the fuel pump. The outlet passage is connected to the pumping chamber and is either directly or indirectly connected to the high-pressure outlet. Instead of "high-pressure outlet" this could simply be referred to as an "outlet", while the term "high-pressure" indicates that the fuel exiting the outlet has been pressurized by the fuel pump. In assembled state, the outlet may be connected to a fuel rail which in turn is connected to a plurality of fuel injectors. During a pumping stroke, fuel is pressurized in the pumping chamber and then expelled from the pumping chamber through the outlet passage. In order to avoid backflow, an outlet valve is interposed between the pump and the outlet. The outlet valve is adapted to selectively enable flow through the outlet passage towards the pumping chamber. The outlet valve is a one-way valve that prevents fuel from flowing in the opposite direction, i.e., towards the pumping chamber. Also, the outlet valve may only enable flow towards the outlet if a certain opening pressure is exceeded. The outlet valve can be disposed inside the outlet passage, for example close to the outlet, close to the pumping chamber or somewhere in between.

For safety reasons the pump includes a relief valve to avoid any overpressure that could burst the pump or other components. The distal side is in fluid communication with the outlet. If an opening pressure of the relief valve is exceeded, the valve member moves to open the valve-member channel and fuel flows to the proximal side. This proximal side is in communication to a location upstream of the outlet valve, e.g., the pumping chamber or a low-pressure inlet of the pump, via a relief passage. One could say that the relief passage bypasses the outlet valve, while the relief valve controls fluid flow through the relief passage. Accordingly, fuel can be released from the outlet passage through the relief passage, e.g., into the pumping chamber. The function of the relief passage is to prevent excessive overpressure in the outlet passage and/or for example a fuel rail connected to the outlet passage. The relief valve only enables fuel flow towards the pumping chamber if a certain opening pressure is exceeded. In other words, if the pressure difference between the outlet passage and the pumping chamber is high enough, the relief valve opens to release fuel from the outlet passage through the relief passage.

The inventive pump is normally a high-pressure pump. Specifically, the pump may be adapted to generate a pressure of at least 200 bar on the distal side of the check valve. The pressure may be even higher, e.g., at least 300 bar are at least 400 bar. This is usually the case for a fuel pump for a car. While the net force acting on the check valve and its components also depends on the pressure on the proximal side, the pressure mentioned above usually means that the check valve has to withstand considerable axial forces. For instance, the press-fit connection between the seat member and the valve bore needs to be tight enough to withstand these forces. This, in turn, means that the risk of a deformation of the seat portion would be increased without the groove used in the inventive design.

It is highly preferred that the groove extends circumferentially around the valve axis. In other words, the shape of the groove is annular and usually symmetric about the valve axis. Any of the shape of the groove, like a groove extending over only a portion of the circumference, could lead to a non-symmetrical coupling between the mounting portion and the seat portion, which in turn could lead to unwanted deformation of the seat portion.

In one embodiment, an axial groove length $I_g$ of the groove is between 40% and 100% of an axial seat-portion length $I_{sp}$ of the seat portion. Accordingly, the groove is not longer than the seat portion, but still has a length that is somewhat comparable. This ratio, which may preferably be between 60% and 80%, influences the decoupling of the seat portion from the mounting portion in two ways. On the one hand, a (axially) longer groove increases the decoupling effect. On the other hand, a longer seat portion is generally more stable than a shorter one. However, both the groove length Ig and the seat-portion length Isp increase the total length of the seat member (which is limited by the size and geometry of the pump), wherefore it is desirable to find a preferred proportion between these two lengths.

On the one hand, it is beneficial if the groove is relatively deep and extends far inwards in the radial direction since this helps to decouple the seat portion from any deformation of the mounting portion. On the other hand, the structure and mechanical stiffness of the seat member as a whole may be compromised if the groove is too deep. Preferably, a minimum groove-portion radius $r_g$ of the groove portion is between 40% and 70% of the pilot radius $r_p$. More specifically, the ratio may be between 45% and 60%. The minimum groove- portion radius (or simply: the groove-portion radius) defines the innermost extent of the groove, one could also say, the bottom of the groove. The pilot radius, on the other hand, defines the “height” of the seat portion on a proximal side of the groove. It will be understood that the groove-portion radius also may depend on the radius of the valve channel, since the difference between theses radii is equivalent to a material thickness radially inside of the groove. This thickness may preferably be between 15% and 35%, or between 20% and 30%, of the pilot radius.

It is preferred that the groove is relatively short and clearly defined. Accordingly, one embodiment provides that the groove is delimited by sidewalls facing each other along the valve axis, each sidewall being disposed at an angle of at least 75° relative to the valve axis. One sidewall is disposed on a proximal side of the groove, while the other one is disposed on a distal side. They can be disposed at an angle of at least 80° or at least 85° with respect to the valve axis. In particular, they can be perpendicular to the valve axis.

Preferably, the seat portion comprises a pilot portion defining the pilot radius $r_p$, and a cone portion that is disposed proximal to the pilot portion and that conically tapers towards a proximal side. In some embodiments, there is a smooth transition between the pilot portion and the cone portion, i.e., they may not be clearly delimited from each other. In any case, the pilot portion defines the pilot radius, i.e., it has the largest radius of the seat portion. The cone portion, on the other hand, has a radius that is smaller than the pilot radius and that decreases towards the proximal side. The cone portion tapers conically, which explicitly includes a frusto-conical shape as well as minor deviations from a strictly (frusto-)conical shape, like a non-linear decrease of the radius along the axial direction. Despite the designations used herein, not only the pilot portion, but also the cone portion may serve to pilot the seat member during its insertion into the valve bore. This function can be facilitated by the tapering shape of the cone portion. Since its radius is small at the proximal side and increases towards the distal side, it helps to guide the seat member into the valve bore e.g., in case of some initial misalignment.

A cone angle $\alpha$ of the cone portion can be between 35° and 50°, or between 40° and 45°. However, in some embodiments, the cone angle may be outside this specified range. This also includes embodiments in which the cone portion is not strictly (frusto-)conical and therefore the cone angle is not constant but has some variation.

In some embodiments, the seat member may be elongate in the axial direction, i.e., its length may be considerably greater than its diameter. However, in one preferred embodiment, an axial seat-member length $I_{sm}$ of the seat member is less than 200% of the valve-bore radius $r_b$. Since the seat member is press-fitted into the valve bore, its maximum outer radius corresponds to the valve-bore radius. Before the seat member is press-fitted into the valve bore, its maximum radius (the abovementioned mounting-portion radius) is somewhat greater than the valve-bore radius, but this difference is normally less than 1%. In this embodiment, the length of the seat member in the axial direction is smaller than the diameter, i.e., less than twice the radius. One could also say that the seat member is relatively short or compact in the axial direction. More specifically, the seat-member length $I_{sm}$ can be less than 170% or even less than 150% of the valve-bore radius $r_b$.

One embodiment provides that the mounting portion has a press-fit portion engaging an inner surface of the valve bore, and a tapered portion disposed proximal to the press-fit portion and adjacent the groove portion, the tapered portion having a smaller radius than the press-fit portion. In other words, the mounting portion does not have a single, constant outer diameter, but it tapers towards the groove portion. A press-fit portion of the mounting portion has a radius (the mounting-portion radius) that is normally constant and corresponds to the valve-bore radius, i.e. it is somewhat larger before the seat member is press-fitted into the valve bore. The tapered portion, and the other hand, has a reduced radius that may also change along the length of the tapered portion. In some embodiments, the shape of the tapered portion may be conical, however with a relatively small cone angle of, e.g., between 5° and 50°. Although the seat portion with its pilot radius has an important role regarding the centering of the seat member inside the valve bore, this function may be supplemented by the tapered portion. Normally, the axial length of the tapered portion corresponds to between 10% and 25% of the length of the entire mounting portion.

As a rule, the seat portion corresponds only to a minor part (i.e., less than 50%) of the entire length of the seat member with respect to the axial direction. On the other hand, in order to provide for sufficient structural stability of the seat portion, it should not be designed too short. In a preferred embodiment, the seat-portion length $I_{sp}$ is between 10% and 30% of the seat-member length $I_{sm}$. More specifically, the percentage may be between 15% and 25%. It will be understood that the precise value may depend on the absolute seat-member length as well as the dimensions of the groove. In case of a deeper groove, it may be helpful to increase the seat-portion length in order to guarantee a sufficient stability.

Among others, the mechanical stability of the seat member and its resistance to deformation depends on the relation between the valve channel and the valve bore. For instance, if the valve channel has a radius not much smaller than the valve bore, this would make the seat member "thin-walled" and thus less stable. On the other hand, the valve channel should not be too narrow in order to provide a wide enough flow path when the check valve opens. Preferably, a channel radius $r_c$ of the valve channel is between 15% and 35% of the valve-bore radius $r_b$. More specifically, it could be between 20% and 30% of the valve-bore radius.

In one embodiment, the channel radius of the valve-member channel is constant. Alternatively, the valve-member channel may have a radius that varies along the axial direction. According to one such embodiment, the valve-member channel has a proximal first channel section with a first channel radius $r_{c1}$ which is reduced with respect to a second channel radius $r_{c2}$ of a distal second channel section, which first channel section extends from an axial position of the seat portion to an axial position of the mounting portion. Although reference is only made to a first and a second channel section, more channel sections are possible. The first channel section is disposed proximally, while the second channel section is disposed distally. The first channel section has a smaller radius than the second channel section. This leads to an increase in material thickness radially outside of the first channel section, i.e., the structure of the seat member is strengthened in this region. Since the first channel section extends from an axial position of the seat portion to an axial position of the mounting portion, it is also disposed radially inside the groove portion. Accordingly, the groove can be designed deeper without excessively weakening the seat member in this region. On the other hand, the second channel section is designed wider, which reduces the flow resistance and also reduces the overall material volume of the check-valve.

The invention also relates to a check valve for a pump, the check valve extending along a valve axis from a proximal side to a distal side and comprising in assembled state:

- an axially extending valve bore defined within a pump body of the pump and having an inner surface,
- a seat member defining an axially extending valve channel and having a mounting portion being press-fitted into the valve bore so that it engages the inner surface, and a seat portion disposed proximal with respect to the mounting portion, the seat portion defining a seat surface around a proximal opening of the valve channel, wherein a pilot radius $r_p$, which is a maximum radius of the seat portion, is at least 95% but less than 100% of valve-bore radius $r_b$ of the valve bore so that the seat portion is out of contact with the inner surface, and
- a valve member movable with respect to the seat member and engaging the seat surface in a closed position to close the valve channel.

A groove portion is axially interposed between the seat portion and the mounting portion, which groove portion defines a groove extending radially inwards between the seat portion and the mounting portion so that the groove portion is at least partially radially spaced from the inner surface by the groove.

All these terms have been explained above with respect to the inventive pump and therefore will not be explained again. Preferred embodiments of the inventive check valve correspond to those of the inventive pump.

BRIEF DESCRIPTION OF THE DRAWINGS

The present invention will now be described, by way of example, with reference to the accompanying drawings, in which.

DETAILED DESCRIPTION OF PREFERRED EMBODIMENTS

Figure 1:
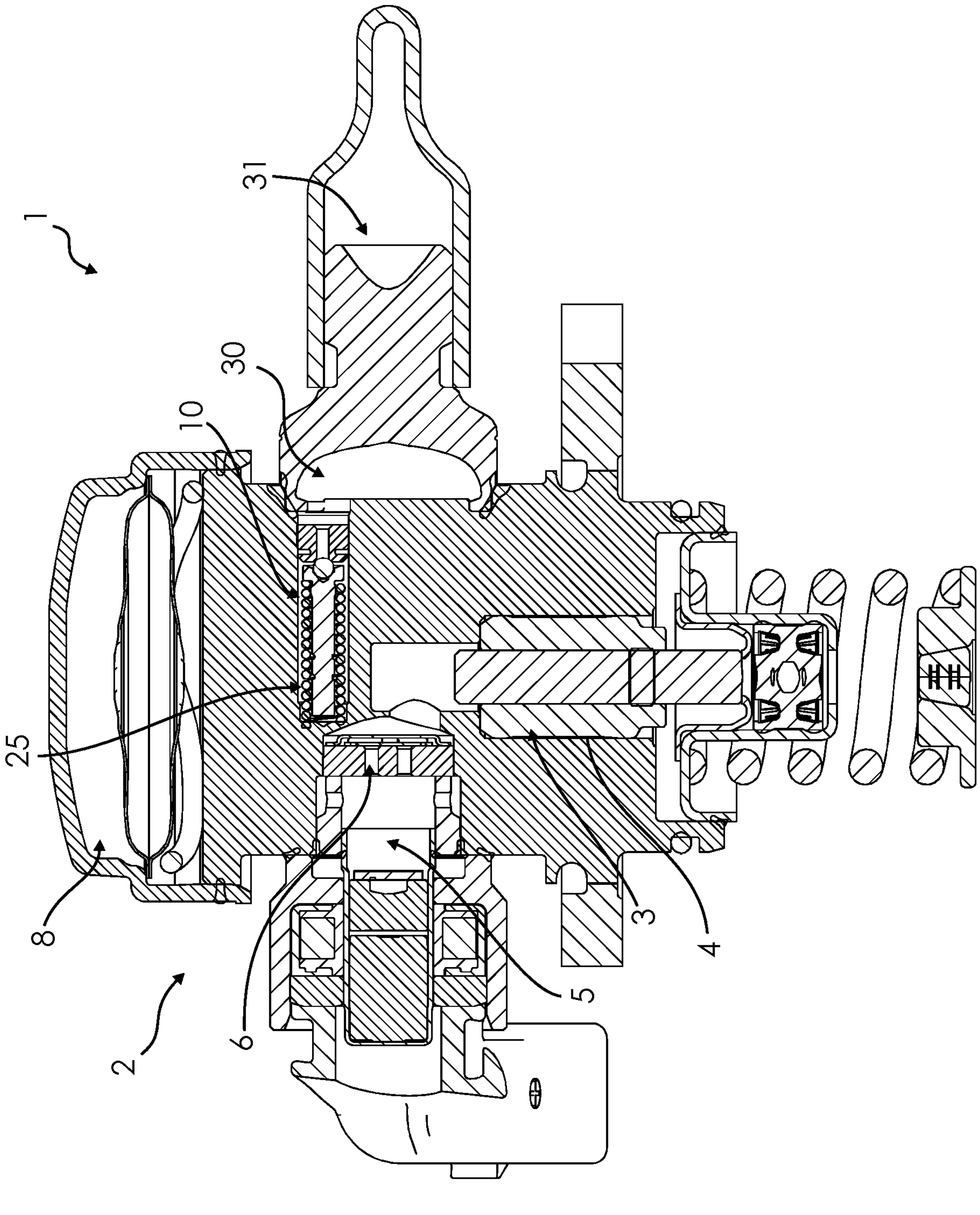
FIG. 1: is a sectional view of an inventive fuel pump.

FIG. 1 shows a fuel pump 1 according to the present invention. The general structure and operating principle of the fuel pump 1 are generally known and thus will only be briefly described here. The fuel pump 1 is typically part of a fuel system (not shown) of an internal combustion engine, which generally includes a fuel tank holding a volume of fuel to be supplied to the engine for operation thereof. A low-pressure fuel pump draws fuel from fuel tank and elevates the pressure of the fuel (e.g. up to 5 bar) for delivery to the (high-pressure) fuel pump 1 which in turn further elevates the pressure of the fuel (e.g. to between 10 bar an 50 bar) for delivery to the fuel injectors, which then directly inject the fuel into the combustion chambers of the cylinders of the engine.

The fuel pump 1 comprises a pump body 2 with various parts, most of which are made of metal, e.g., stainless steel. The pump body 2 defines a pumping chamber 3 with a pumping plunger 4, which is adapted to reciprocate within the pumping chamber 3 and may be mechanically linked to a rotating camshaft (not shown) of the engine. The pumping chamber 3 is connected to an inlet passage 5 with an inlet valve 6. The inlet passage 5 is connected to a low- pressure inlet (not visible) of the fuel pump 1, via which the fuel pump 1 can be connected to the abovementioned low-pressure pump. The fuel enters the pump through the low-pressure inlet and is guided to the inlet passage via a damping volume 8, which is arranged in a damper cup mounted to the pump body 2.

The pump body 2 also defines an outlet passage 30 with an outlet valve (not shown), which outlet passage 30 connects the pumping chamber 3 to a high-pressure outlet 31 of the fuel pump 1. Furthermore, the pump body 2 defines a relief passage 25 with a relief valve 10. The outlet valve is a check valve that enables fuel flow from the pumping chamber 3 to the outlet 31 if the pressure in the pumping chamber 3 exceeds the pressure in the outlet passage 30. The relief valve 10 also is a check valve that enables flow from the outlet passage 30 through the relief passage 25 back to the pumping chamber 3 in case the pressure in the outlet passage 30 exceeds the pressure in the pumping chamber 3 and the difference is greater than a defined opening pressure.

During operation, the reciprocating movement of the pumping plunger 4 causes fuel to be drawn from the inlet passage 5 into the pumping chamber 3 during an intake stroke. During a following pumping or compression stroke, the fuel in the pumping chamber 3 is pressurized and expelled through the outlet valve and the outlet passage 30. The fuel can then be supplied via the outlet 31 to a fuel rail that is connected to the above-mentioned injectors. During the compression stroke, the inlet valve 6 prevents backflow through the inlet passage 5. If at any time the pressure difference between the outlet passage 30 and the pumping chamber 3 exceeds the predefined opening pressure, the relief valve 10 opens to release fuel from the outlet passage 30 through the relief passage 25 into the pumping chamber 3, thereby preventing possible damage to any components downstream of the fuel pump 1.

Figure 2:
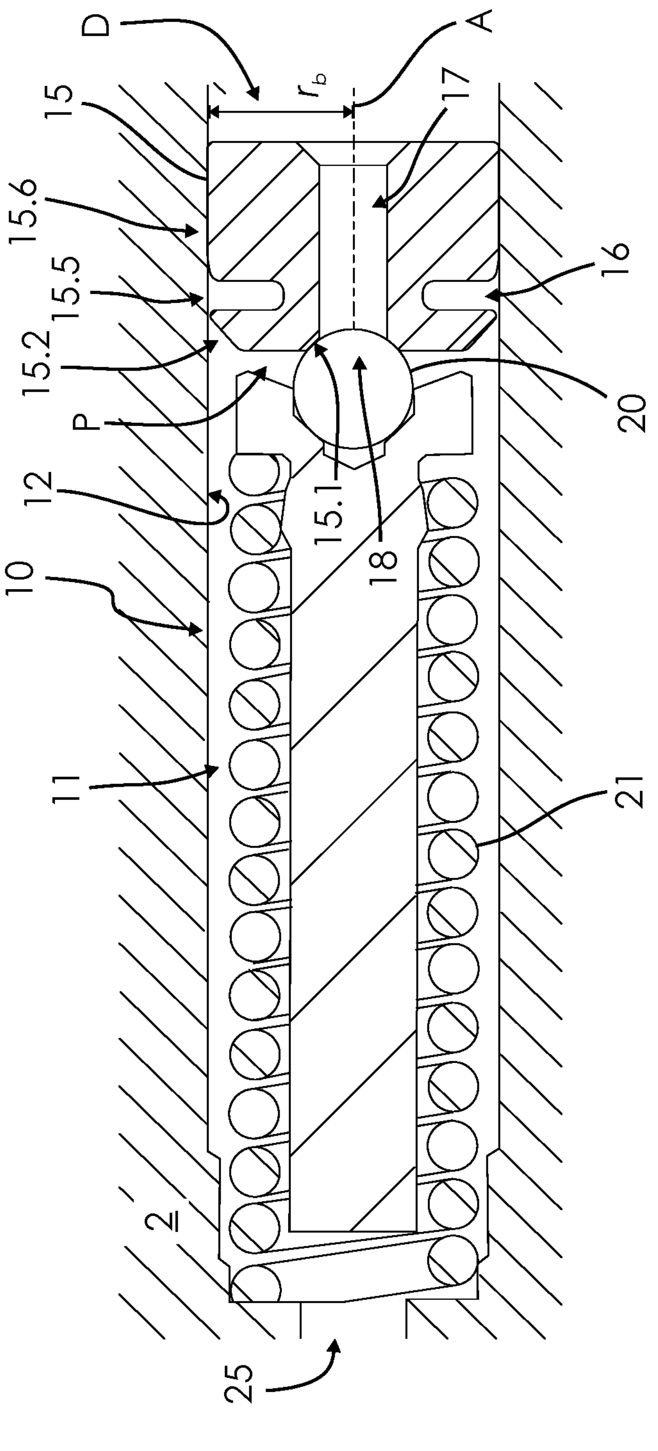
FIG. 2: is a sectional view of a detail of the fuel pump of FIG. 1 with an inventive relief valve.
Figure 4:
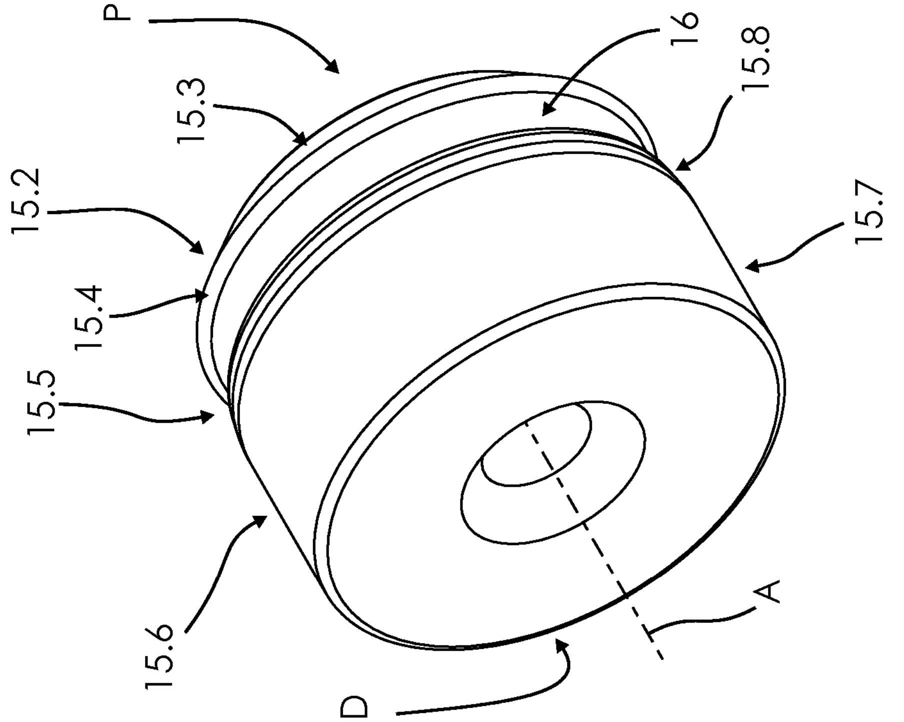
FIG. 4: is a perspective view of the seat member of FIG. 3.
Figure 3:
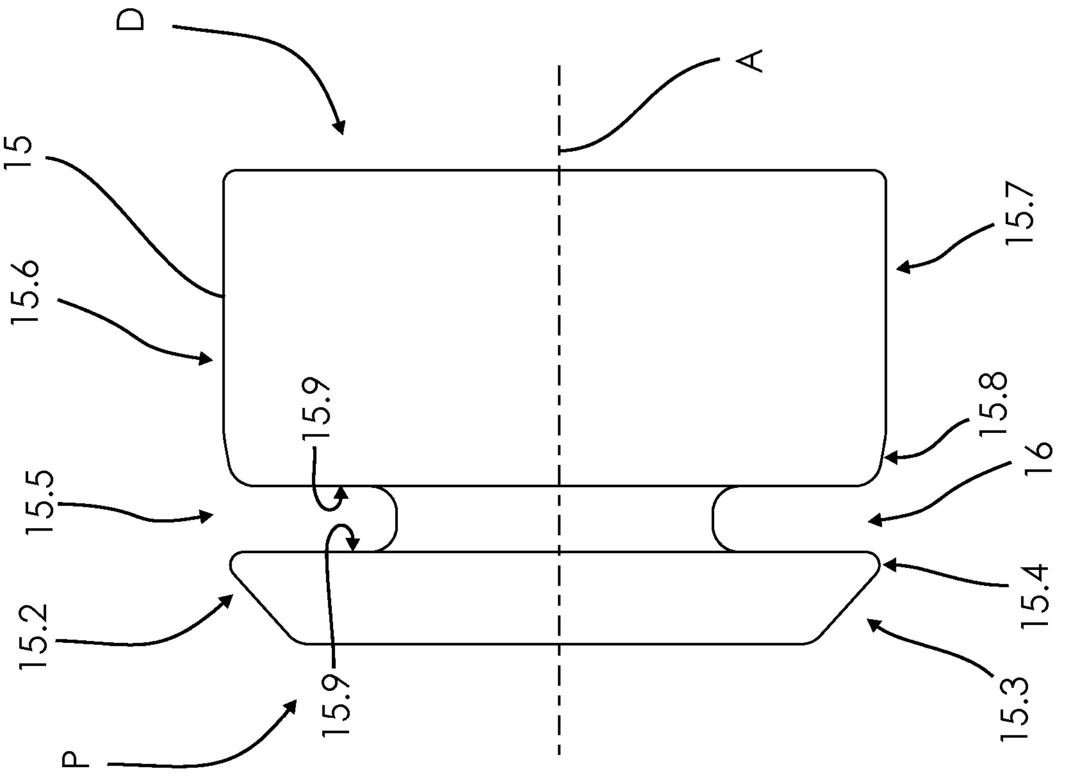
FIG. 3: is a side view of a first embodiment of a member for the relief valve of FIG. 2.
Figure 5:
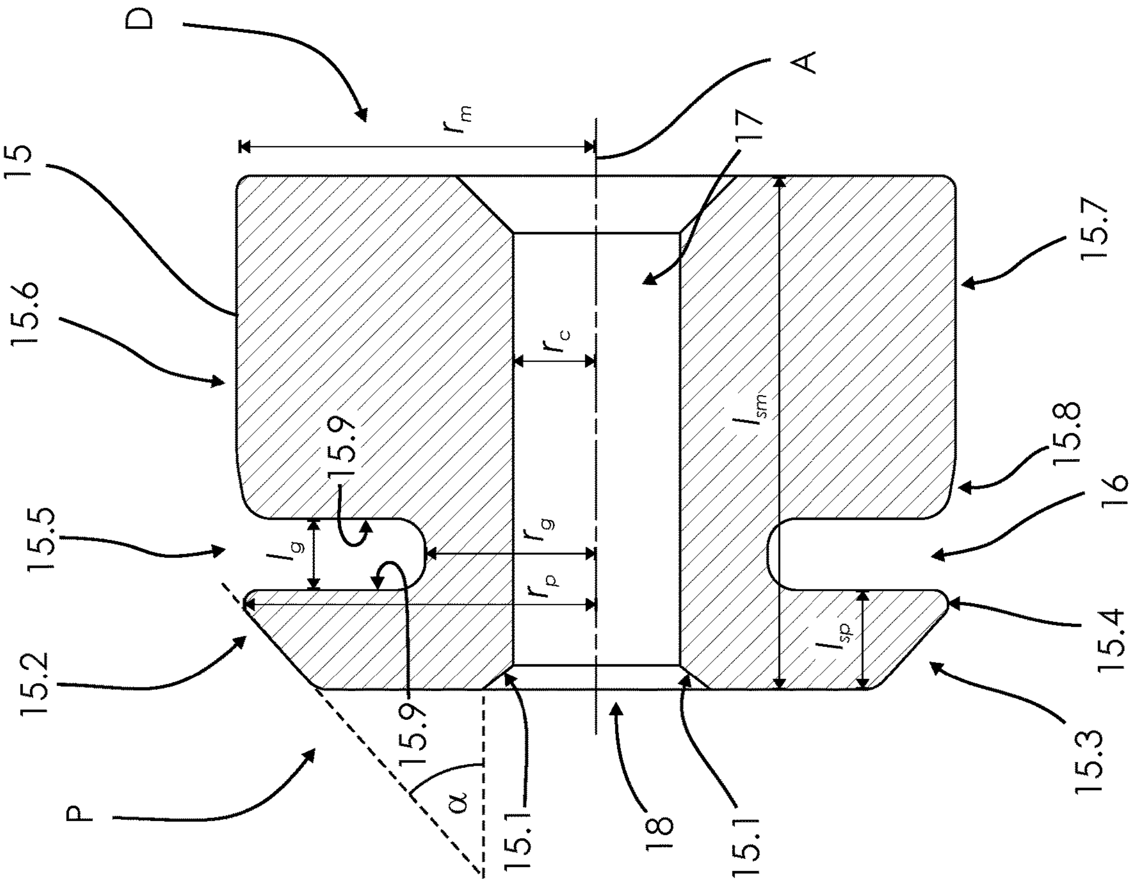
FIG. 5: is a sectional side view of the seat member of FIG. 3.

Details of the relief valve 10 will now be discussed with reference to FIGS. 2 to 5. The relief valve 10 comprises a valve bore 11, which is part of the relief passage 25 or directly connected thereto. The valve bore 11 is aligned along a valve axis A, which defines an axial direction, and has a circular cross-section with a valve-bore radius $r_b$ of e.g. 2.5 mm in this embodiment. The main elements of the valve mechanism are a seat member 15 and a valve member 20. The seat member 15 is stationary and is connected to the pump body 2 by press-fitting it into the valve bore 11. The valve member 20, on the other hand, is axially movable and is biased against the seat member 15 by a spring member 21. The valve member here takes the form of a ball. Specifically, in a closed position, which is shown in FIGS. 1 and 2, the valve member 20 engages a seat surface 15.1 of the seat member 15. As can also be seen in FIGS. 3 to 5, the seat surface 15.1 has an overall annular shape and is disposed around a proximal opening 18 of a valve channel 17 that traverses the seat member 15. The valve channel 18 is symmetrical about the valve axis A and has a circular cross-section with a channel radius $r_c$. In this exemplary embodiment, the channel radius $r_c$ is 0.58 mm, corresponding to about 23% of the valve-bore radius $r_b$. In other embodiments, this ratio could be different, e.g., between 15% and 35%.

Along the axial direction A, three different portions of the seat member 15 can be distinguished. The seat surface 15.1 is disposed on a seat portion 15.2 which is out of contact with an inner surface 12 of the valve bore 11, while a mounting portion 15.6 engages the inner surface 12 by a press fit. A groove portion 15.5 is interposed between the seat portion 15.2 and the mounting portion 15.5. It defines a single groove 16 that extends radially inwards. The groove portion 15.5 is radially spaced from the inner surface by the groove.

The shape and dimensions of the seat member 15 and its portions 15.2, 15.5, 15.6 will now be described in more detail. It is understood that these dimensions are exemplary and can be modified depending on many factors, like the overall size and performance of the fuel pump 1. An axial seat-member length $l_{sm}$ of the seat member 15 is 3.6 mm, which corresponds to less than 200% of the valve-bore radius $r_b$, in this case 144%. The seat portion 15.2 has an overall axial seat-portion length $l_{sp}$ of 0.7 mm, which is about 19% of the seat-member length $l_{sm}$, but could otherwise be, e.g., between 10% and 30%. It comprises a pilot portion 15.4 disposed adjacent the groove 16 and defining a pilot radius $r_p$, of 2.46 mm, and a cone portion 15.3 that is disposed proximal to the pilot portion 15.4 and that conically tapers towards the proximal side P. Specifically, the cone portion 15.3 has a frusto-conical shape with a cone angle $\alpha$ of about 42°, which could otherwise be, e.g., between 35° and 50°. Since the pilot radius $r_p$ is only minimally smaller than the valve-bore radius $r_b$, corresponding to 98% thereof, the pilot portion 15.4 facilitates piloting or guiding of the seat member 15 during its insertion into the valve bore 11.

The mounting portion 15.6 has a press-fit portion 15.7 and a tapered portion 15.8. In its undeformed state, i.e. before insertion into the valve bore, a mounting-portion radius $r_b$ of the press-fit portion 15.7 is 2.52 mm, i.e., somewhat larger than the valve-bore radius $r_b$. Accordingly, after insertion into the valve bore 11, the press-fit portion 15.7 engages the inner surface 12 of the valve bore 11. The tapered portion 15.8, which is disposed proximal to the press-fit portion 15.7 and adjacent the groove portion 15.5, has a smaller radius than the press-fit portion 15.7. Accordingly, it remains out of contact with the inner surface 12 but may complement the guiding function by the pilot portion 15.4 during the insertion and press-fitting process.

In this embodiment, the groove 16 extends circumferentially around the valve axis A and has an axial groove length $l_g$ of 0.5 mm, corresponding to 71% of the seat-portion length $l_{sp}$. However, this ratio could be different, e.g. between 40% and 100%. A minimum groove-portion radius $r_g$ of the groove portion 15.5 is 1.2 mm, corresponding to 48% of the pilot radius $r_p$. Alternatively, this ratio could be, e.g., between 40% and 70%. A radial "depth" of the groove 16 is about 1.27 mm. The groove 16 is delimited by sidewalls 15.9 facing each other along the valve axis A, each sidewall 15.9 being perpendicular to the valve axis A.

By the presence of the groove 16, the seat portion 15.6 is mechanically decoupled from the deformation of the mounting portion 15.2 during the press-fitting procedure. Accordingly, a precise shape of the seat surface 15.1 is maintained, as is necessary to maintain a sealing engagement of the valve member 20 with the seat surface 15.1. Considering the channel radius $r_c$ and the minimum groove-portion radius $r_g$, a remaining material thickness radially inside the groove 16 is about 0.61 mm, which is sufficient to maintain an overall structural stability of the seat member 15.

Figure 6:
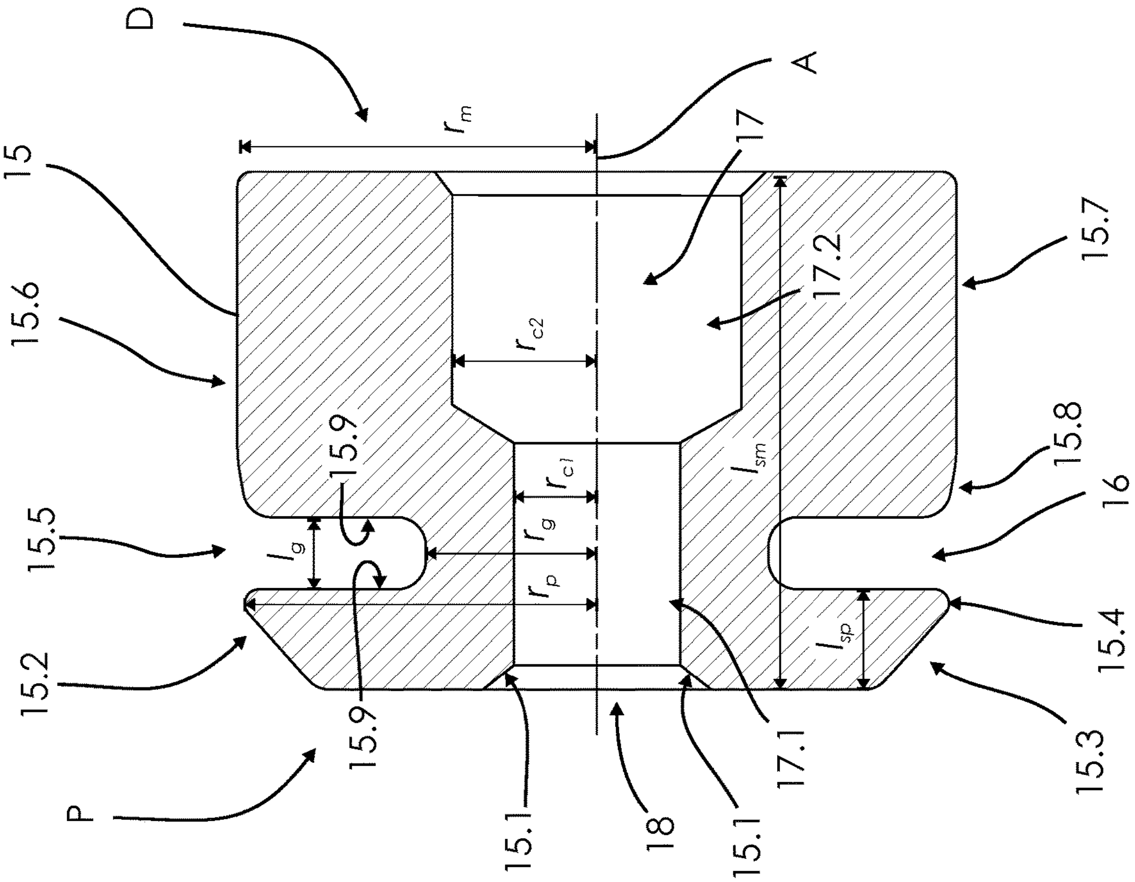
FIG. 6: is a sectional side view of a second embodiment of a seat member.

FIG. 6 shows a second embodiment of a seat member 15 for the relief valve 10. Apart from minor differences, which will not be discussed here, this embodiment is mostly identical to the first embodiment. However, the valve channel 17 does not have a constant radius. Rather, it has a proximal first channel section 17.1 with a first channel radius $r_{c1}$ which is reduced with respect to a second channel radius $r_{c2}$ of a distal second channel section 17.2. In this embodiment, first channel radius $r_{c1}$ is 0.58 mm and the second channel radius $r_{c2}$ is 1.00 mm. The first channel section 17.1 extends from an axial position of the seat portion 15.2, along the groove portion 15.5 and to an axial position of the mounting portion 15.6. Accordingly, the seat member 15 is reinforced near the groove 16, which may help to prevent deformation of the seat portion 15.2. Possibly, the depth of the groove 16 could even be increased, i.e., the groove-portion radius $r_g$ could be decreased without destabilizing the seat member 15 in an unwanted way. On the other hand, the greater second channel radius $r_{c2}$reduces the flow resistance inside the valve channel 17 and reduces the overall volume of the seat member 15.

LEGEND OF REFERENCE NUMBERS

1 fuel pump
2 pump body
3 pumping chamber
4 pumping plunger
5 inlet passage
6 inlet valve
8 damping volume
10 relief valve
11 valve bore
12 inner surface
15 seat member
15.1 seat surface
15.2 seat portion
15.3 cone portion
15.4 pilot portion
15.5 groove portion
15.6 mounting portion
15.7 press-fit portion
15.8 tapered portion
15.9 sidewall
16 groove
17 valve channel
17.1 first channel portion
17.2 second channel portion
18 proximal opening
20 valve member
21 spring member
25 relief passage
30 outlet passage
31 outlet
A valve axis
D distal side
$I_g$ groove length
$I_{sm}$ seat-member length
$I_{sp}$ seat-portion length
P proximal side
$r_b$ valve-bore radius
$r_c$ channel radius
$r_{c1}$ first channel radius
$r_{c2}$ second channel radius
$r_g$ groove-portion radius
$r_m$ mounting-portion radius
$r_p$ pilot radius
$\alpha$ cone angle

The invention claimed is:

1. A pump comprising a check valve extending along a valve axis from a proximal side to a distal side, the check valve comprising:

a. an axially extending valve bore defined within a pump body of the pump and having an inner surface, b. a seat member defining an axially extending valve channel and having a mounting portion being press-fitted into the valve bore so that it engages the inner surface, and a seat portion disposed proximal with respect to the mounting portion, the seat portion defining a seat surface around a proximal opening of the valve channel, wherein a pilot radius, which is a maximum radius of the seat portion, is at least 95% but less than 100% of a valve-bore radius of the valve bore so that the seat portion is out of contact with the inner surface, and c. a valve member movable with respect to the seat member and engaging the seat surface in a closed position to close the valve channel, wherein a groove portion is axially interposed between the seat portion and the mounting portion, which groove portion defines a groove extending radially inwards between the seat portion and the mounting portion so that the groove portion is at least partially radially spaced from the inner surface by the groove.

2. The pump according to claim 1, wherein the check valve is a relief valve, and the pump is a fuel pump with a pumping chamber connected to a high-pressure outlet via an outlet valve, wherein the distal side is in fluid communication with the high-pressure outlet and the proximal side is in fluid communication with a location upstream of the outlet valve via a relief passage.

3. The pump according to claim 1, being adapted to generate a pressure of at least 200 bar on the distal side of the check valve.

4. The pump according to claim 1, wherein the groove extends circumferentially around the valve axis.

5. The pump according to claim 1, wherein an axial groove length of the groove is between 40% and 100% of an axial seat-portion length of the seat portion.

6. The fuel pump according to claim 1, wherein a minimum groove-portion radius of the groove portion is between 40% and 70% of the pilot radius.

7. The pump according to claim 1, wherein the groove is delimited by sidewalls facing each other along the valve axis, each sidewall being disposed at an angle of at least 75° relative to the valve axis.

8. The pump according to claim 1, wherein the seat portion comprises a pilot portion defining the pilot radius, and a cone portion that is disposed proximal to the pilot portion and that conically tapers towards the proximal side.

9. The pump according to claim 8, wherein a cone angle of the cone portion is between 35° and 50°.

10. The pump according to claim 1, wherein an axial seat-member length of the seat member is less than 200% of the valve-bore radius.

11. The pump according to claim 1, wherein the mounting portion has a press-fit portion engaging an inner surface of the valve bore, and a tapered portion disposed proximal to the press-fit portion and adjacent the groove portion, the tapered portion having a smaller radius than the press-fit portion.

12. The fuel pump according to claim 1, wherein the seat-portion length is between 10% and 30% of the seat-member length.

13. The pump according to claim 1, wherein a channel radius of the valve channel is between 15% and 35% of the valve-bore radius.

14. The pump according to claim 1, wherein the valve-member channel has a proximal first channel section with a first channel radius which is reduced with respect to a second channel radius of a distal second channel section, which first channel section extends from an axial position of the seat portion to an axial position of the mounting portion.

15. A check valve for a pump, the check valve extending along a valve axis from a proximal side to a distal side and comprising in assembled state:

a. an axially extending valve bore defined within a pump body of the pump and having an inner surface, b. a seat member defining an axially extending valve channel and having a mounting portion being press-fitted into the valve bore so that it engages the inner surface, and a seat portion disposed proximal with respect to the mounting portion, the seat portion defining a seat surface around a proximal opening of the valve channel, wherein a pilot radius, which is a maximum radius of the seat portion, is at least 95% but less than 100% of a valve-bore radius of the valve bore so that the seat portion is out of contact with the inner surface, and c. a valve member movable with respect to the seat member and engaging the seat surface in a closed position to close the valve channel, wherein a groove portion is axially interposed between the seat portion and the mounting portion, which groove portion defines a groove extending radially inwards between the seat portion and the mounting portion so that the groove portion is at least partially radially spaced from the inner surface by the groove.

* * * * *